United States Patent [19]

Herring

[11] Patent Number: 4,501,841
[45] Date of Patent: Feb. 26, 1985

[54] ELASTOMERIC INSULATING MATERIALS FOR ROCKET MOTORS

[75] Inventor: Liles G. Herring, Waco, Tex.

[73] Assignee: Hercules Incorporated, Wilmington, Del.

[21] Appl. No.: 463,365

[22] Filed: Feb. 3, 1983

[51] Int. Cl.$^3$ .............. C08L 21/00; F42B 9/16; F02K 9/34
[52] U.S. Cl. .................... 524/411; 524/409; 524/567; 524/574; 524/590; 524/586; 428/36; 428/521; 428/425.5; 428/425.6; 428/451; 428/477.7; 428/476.9; 428/403
[58] Field of Search ............ 428/425.5, 425.6, 451, 428/477.7, 476.9, 521; 524/567, 574, 590, 586

[56] References Cited
U.S. PATENT DOCUMENTS
3,524,794 8/1970 Jonnes et al. ............ 428/425.5

FOREIGN PATENT DOCUMENTS
0020273 12/1982 European Pat. Off. .

Primary Examiner—P. Ives
Attorney, Agent, or Firm—Edmund C. Ross, Jr.

[57] ABSTRACT

Non-asbestos elastomeric insulating materials for rocket motors are disclosed. The insulating materials are low in density (between about 0.035 and 0.050 lb./cubic inch) and comprise 100 parts by weight of a crosslinked elastomer polymer in which are dispersed between about 10 and 100 (preferably 15-75) parts by weight of a char forming organic fiber selected from polyaramide pulps and between about 5 and 75 parts by weight inorganic particulate. The insulating materials issue little smoke, have notable erosion resistance and can be tailored to have thermal, mechanical and other properties of desired character. Ingredients such as phenolics, flame retardants, and liquid polybutadiene can enhance the utility of the insulating materials in certain embodiments.

5 Claims, No Drawings

ELASTOMERIC INSULATING MATERIALS FOR ROCKET MOTORS

The United States Government has rights in this invention under Contract FO4611-80-C-0040 awarded by the Air Force.

BACKGROUND OF THE INVENTION

1. Field of Use

This invention relates to elastomeric insulating materials especially suited for use as low smoke insulation in rocket motors. This invention, more particularly, relates to such elastomeric insulating materials that are free of asbestos and, yet, perform as well or better than analogous insulating materials containing asbestos. This invention, still more particularly, relates to such elastomeric insulating materials that contain char forming organic fiber selected from polyaramide pulps as low density fillers which enhance the mechanical properties of the insulators and form a strong, adherent char.

2. Prior Art

Elastomeric insulating materials containing asbestos have long been employed within rocket motor cases including such portions thereof as their blast tubes. This invention relates to insulating materials which are similarly suited for use in rocket motors but are advantageously free of asbestos.

CROSS-REFERENCE TO RELATED APPLICATIONS

This application is related to U.S. Ser. No. 418,311 filed Sept. 15, 1982, in the name of Herring and entitled "Elastomer Insulation Materials For Rocket Motors."

OBJECTS OF THE INVENTION

It is an object of this inventing to provide low density, elastomeric insulating materials for rocket motors.

It is an object of this invention to provide such elastomeric insulating materials in which certain char forming organic fiber replaces asbestos.

It is an object of this invention to provide such asbestos free elastomeric insulating materials that are low in smoke issuance and can exibit certain important properties as least as good as insulating materials containing asbestos.

It is an object of this invention to provide methods for compounding and use of these elastomeric insulating materials.

These and other objects are achieved in accordance with practices of this invention; these practices are described more fully in the following together with the manner in which such objects are accomplished.

As used in the following description of this invention, the term "case wall insulation" refers to a layer or layers of material bonded to the internal wall of the rocket motor case to protect the case from the hot combustion processes occurring during the functioning of the rocket motor.

The term "blast tube insulation" in the following refers to material used to line the internal diameter of the blast tube of a rocket. The term "blast tube" refers to the conduit that conveys combustion products of the motor to the nozzle of the rocket. In some rocket motors, due to missile design, the nozzle cannot be connected directly to the rocket motor thereby requiring such a "blast tube." The blast tube lining protects this tube from the hot combustion gases of the rocket motor.

"Blast tube ramp insulator" as used herein refers to the insulation material carried by an aftly converging section of a rocket motor between the rocket motor case (larger, diameter) and the blast tube (smaller diameter). The term "low smoke" in reference to the elastomeric insulating materials of this invention means that firing of rockets in which these materials serve as insulation yields little or no smoke attributable to the insulations.

The nature of specific blast tube and blast tube ramp insulators, as well as case wall insulators, depends on both mass flux, in the area of application, and burning duration of the rocket motor.

BRIEF SUMMARY OF THE INVENTION

The non-asbestos elastomeric insulating material of this invention comprises 100 parts by weight of a crosslinked elastomeric polymer in which are dispersed between about 10 and 100 (more preferably between about 15 and 75) parts by weight of a char forming organic fiber selected from polyaramide pulps and between about 5 and 75 parts by weight inorganic particulate such as silica. The density of the elastomeric insulating materials is in a range between about 0.035 and 0.050 pounds per cubic inch.

Among the crosslinkable elastomeric polymers suitable for this invention are the synthetic rubbers: ethylene propylene diene monomer (EPDM), polyurethane, chlorosulfonated polyethylene and polychloroprene. These rubbery polymers are crosslinked by peroxy or other crosslinking agents formulated in the elastomeric insulating compounds.

DETAILED DESCRIPTION OF THE INVENTION

Elastomeric insulating materials of this invention can serve such uses as case wall and blast tube ramp insulations for rocket motors.

In addition to crosslinked elastomer polymer, the elastomeric insulating materials, most importantly, contain intimately dispersed char forming organic fiber comprising polyaramide pulp. The polyaramide pulp functions as a low density filler in the insulating materials that enhances mechanical properties thereof. The aromatic polymeric character of the polyaramide pulp advantageously promotes formation of a strong, adherent char from the elastomer insulating materials during propellant burning.

The polyaramide pulp suitable for use in this invention is commercially available, sold for example by E. I. duPont as Kevlar® aramide pulp fiber. The polyaramide pulp preferably is a short, highly fibrillated fiber in which the fibrillation is resultant of axially oriented, crystallites that are less strongly bonded transversely. The fibrillation provides length to diameter ratios for the pulps that are preferably in a range above about 500.

The preferred polyaramide pulps have physical properties as set forth in Table I:

TABLE I

| | |
|---|---|
| Tensile Strength KPa × $10^3$ | 3000–4000 |
| Tensile Modulus KPa × $10^6$ | 75–100 |
| Elongation % | 3–5 |
| Density g/cc | 1.4–1.5 |
| Filament Dia. um | 10–14 |
| Degradation Temp. | 400–600° C. |

TABLE I-continued

| | |
|---|---|
| Thermal Expansion Coefficient | $-2 \times 10^{-6}/°C.$ |

Examplary particle size characterizations for polyaramide pulps currently available for use in this invention are set forth in Table II below:

TABLE II

| | A* | B* | C* |
|---|---|---|---|
| +14 Mesh | 16 ± 5 | 4 ± 2 | 4 ± 2 |
| −14 +30 Mesh | 22 ± 5 | 17 ± 3 | 17 ± 3 |
| −30 +50 Mesh | 25 ± 3 | 33 ± 5 | 33 ± 5 |
| −50 +100 Mesh | 19 ± 4 | 26 ± 2 | 26 ± 2 |
| −100 Mesh | 17 ± 5 | 20 ± 4 | 20 ± 4 |
| Nominal Average Length | 4 mm | 2 mm | 2 mm |

*Kevlar pulps sold by Dupont as Long Wet Lap, Merge 6F204; Short Wet Lap Merge 6F205; and Dry Pulp Merge 6F218, respectively.

The dry pulp C of Table II, is preferred for this invention. Drying of the wet pulps B and C prior to compounding is preferred for their use in this invention.

This invention is not limited to any particular elastomeric polymer. As long as the polymer is a cross-linkable and moldable solid, the advantages of this invention are obtainable. Exemplary polymers, however, are polychloroprene, chlorosulfonated polyethylene, polyurethane, and ethylene propylene diene monomer (EPDM) rubbers.

Specific suitable EPDM polymers are available as Nordel ® 1040 from Dupont, Royalene ® 100 from Uniroyal, Epsyn ® 4506 from Copolymer and Vistalon ® 2504 from Exxon.

Preferred EPDM polymers have the following properties:

| | |
|---|---|
| Density, g/cc | 0.85 to 0.865 |
| Mooney, ML-4 @ 212 F. | 25 to 60 |
| Brittle Point, °F. | −90 F. |
| Hardness, Short A | 30 to 90 |
| Tensile Strength (gumstock, psi | 500 to 1000 |

Polychloroprenes suitable for use in this invention are commercially available. Polychloroprenes can be made by reacting vinylacetylene with chlorine gas to form a chloroprene followed by polymerization in the presence of base to yield the desired polychloroprene. Preferred polychloroprenes are crystallization resistant, an example of which is Neoprene WRT from DuPont.

Polyurethane polymers suitable for this invention are commercially available crosslinkable solids and are made by reacting an active hydrogen compound (e.g. polyol or polyester) with a polyisocyanate in quantities that do not lead to extensive crosslinking.

Chlorosulfonated polyethylenes are commercially available as, for example, Hypalon ® polymers from DuPont. These polymers can be made by reacting polyethylene with up to about 45% by weight chlorine and a sulfur oxide such that these polymers contain between about 30 and 40% by weight chlorine and between about 1 and 3% by weight sulfur.

Inorganic reinforcing particulate can be included in the elastomeric insulating materials of the invention; the inorganic particulate is preferably hydrated silica which has a particle size of between about 20 and 50 microns. Other such inorganic particulates that can be suitably employed include such siliceous materials as mica and quartz.

The insulating materials may have additives to enhance the flame retardant properties of the insulation. For example, chlorinated organic compounds can be used with antimony oxide or hydrated alumina to further enhance flame retardance of the insulating materials. An exemplary chlorinated hydrocarbon for this purpose is Dechlorane ® flame retardant. The organic flame retardant is typically used at between about 10 and 80 phr, more preferably 15 and 65 phr where phr as used herein refers to parts by weight per 100 parts of the aforementioned elastomeric polymer. Antimony oxide or hydrated alumina is preferably used with the organic flame retardant at levels between about 5 and 40 phr, more preferably between about 10 and 30 phr.

Liquid polybutadiene is an organic material which can be advantageously employed in compounding certain of the elastomeric insulating materials of this invention. Suitable liquid polybutadienes are unsaturated and have molecular weights (number average) between about 1000–5000. Advantage in use of the liquid unsaturated polybutadienes results from their ability to aid in dispersing the polyaramide pulp during compounding of the elastomeric insulating material. A typical level is between about 1 and 50 phr, more preferably 5 and 20 phr of the liquid polybutadiene. An exemplary liquid polybutadiene is Butarez ® NF from Phillips Petroleum; another is Ricon ® 150 from Colorado Specialties.

Phenolic resins can be employed, typically between about 30 and 125 phr, for increasing char formation and enhance erosion resistance, particularly in chlorosulfonated polyethylene insulating materials of this invention. Exemplary phenolic resin products for this purpose are Resinox ® materials from Monsanto. The use of phenolic resins enable the elastomeric insulating materials to cure into a rigid, hard body.

Among the peroxy crosslinking agents which can be used for crosslinking of elastomeric insulating compounds of this invention are: 1,1-di(t-butylperoxy)3,3,5-trimethylcyclohexane; t-butylperoxy-2-ethylhexaneoate; t-butylperoxybenzoate; 2,5-dimethyl-2,5-di-(benzoylperoxy)hexane; t-butylperoxymaleic acid; dicumyl peroxide; 2,5-dimethyl-2,5-di(t-butylperoxy)hexane and di-t-butylperoxide. The peroxy crosslinking agents are used in amounts which range between about 1 and 10 phr.

For chlorosulfonated polyethylene polymers, a starch or other polyol and magnesium or zinc oxide curing system is preferred to obtain desired crosslinking; addition of peroxy crosslinking agents in compounding with these polymers is for crosslinking the polybutadiene which is advantageously included in the formulations. The polyol and metal oxide curing systems can be used at a range of between about 2 and 50 phr. Pentaerythritol used as a polyol in the curing system is included in a range between about 0.5–5 phr. Starch is ordinarily employed as the polyol at higher levels, e.g. 10–80 phr.

Polychloroprene polymers are preferably crosslinked with metal oxide such as zinc or magnesium oxide. Like the chlorosulfonated polyethylene compounds, the polychloroprene compounds used in making the elastomeric insulating materials of this invention preferably include liquid polybutadiene and peroxy crosslinking agent therefor. In polyurethane formulations, liquid polyesters serve a similar purpose as the liquid polybutadiene.

The elastomeric insulation materials of this invention may be from flexible to rigid using ingredients as above described. High levels of reinforcing particulate, up to about 80% by weight of the elastomeric insulating materials, can be used for modifying the modulus as desired for particular applications.

Set forth in Tables A, B, C, D, and E below are exemplary formulation ranges for the elastomeric insulating materials of this invention. Advantageously, specific cured elastomer insulators can be selected to have high erosion resistance comparable or better than their asbestos containing analogs as well as desirable thermal and mechanical properties including bonding capacity to standard propellants and bonding agents.

TABLE A

| Ingredient | Parts by Weight |
| --- | --- |
| Chlorosulfonated Polyethylene | 100 |
| Liquid Polybutadiene | 10–30 |
| Magnesia | 1–5 |
| Hydrated Silica | 10–30 |
| Polyaramide Pulp | 30–50 |
| Accelerator | 0.5–5 |
| Peroxy Crosslinking Agent | 1–5 |
| Polyol Curing Agent | 1–40 |

The elastomeric insulating materials of this embodiment A have superior erosion resistance and low smoke. Density ranges between about 0.042 and 0.048 pounds per cubic inch for these insulations. When phenolic resin such as Resinox ® is included at between about 80–125 phr, the resultant insulation is a rigid body and can be used as a blast tube ramp or insulator.

TABLE B

| Ingredient | Parts by Weight |
| --- | --- |
| Polychloroprene | 100 |
| Magnesium oxide | 1–5 |
| Peroxy Crosslinking Agent | 0.5–5 |
| Polyaramide Pulp | 30–80 |
| Liquid Polybutadiene | 10–30 |
| Hydrated Silica | 10–30 |

The elastomeric insulating materials of this embodiment B have good erosion resistance, low smoke and, advantageously, do not absorb significant amounts of low polarity plasticizer from propellants containing the same. Density ranges between about 0.045 and 0.050 pounds per cubic inch for these insulations.

TABLE C

| Ingredient | Parts by Weight |
| --- | --- |
| EPDM | 100 |
| Peroxy Crosslinking Agent | 1–5 |
| Organic Flame retardant | 20–60 |
| Inorganic Flame Retardant | 10–40 |
| Polyaramide Pulp | 10–60 |
| Liquid Polybutadiene | 0–50 |

The elastomeric insulating materials of this embodiment C are especially suited to case wall insulation in view of flame retarding and physical and thermal properties thereof. Density ranges between about 0.030 and 0.040 pounds per cubic inch for these insulations.

TABLE D

| Ingredient | Parts by Weight |
| --- | --- |
| EPDM | 100 |
| Peroxy Crosslinking Agent | 1–5 |
| Liquid Polybutadiene | 0–25 |
| Polyaramide Pulp | 20–80 |
| Hydrated Silica | 10–30 |

The elastomeric insulating of this embodiment D of this invention are of relatively low smoke and are desirably employed as flexible, low density insulators having superior erosion, mechanical and thermal properties as well as bond strengths. Density ranges between about 0.035 and 0.042 pounds per cubic inch for these insulations.

TABLE E

| Ingredient | Parts by Weight |
| --- | --- |
| Polyurethane | 100 |
| Peroxy Crosslinking Agent | 0.5–5 |
| Hydrated Silica | 10–30 |
| Polyaramide Pulp | 30–70 |
| Processing aid | 5–15 |

The elastomeric insulating materials formulated with ingredients as shown in Table E have use as low smoke case wall insulation. Density ranges between about 0.045 and 0.050 pounds per cubic inch for these insulations.

Compounding of the insulating materials of this invention is at temperatures below those which cure the elastomeric polymer and permit loss of compounding ingredients. Normally, these temperatures are below about 250° F. Conventional mixing and milling equipment can be used in the compounding.

The elastomeric insulating materials of this invention can be applied to motor cases by wrapping a "bladder mandrel" with calendered sheets of the insulator. The bladder is then inserted into the case and inflated. The inflated bladder forces the insulation against the motor case (or ramp) where it consolidates under pressure. The assembly, with inflated bladder, is then placed in an oven where the insulator is cured. Oven temperature of 250° F. to 350° F. are commonly used. For curing with peroxide, a minimum temperature of about 310° F. is usually required. After the curing, the bladder is removed leaving an insulated motor case. It is often advantageous to use primers on metal case walls to enhance bonding of the elastomeric insulating material. Primers such as Chemlok 233 or a combination of Chemlok 205 and 234B (products of Hughson Division of Lord Corporation) can be used.

Alternative to the use of the aforedescribed inflatable mandrel technique, the elastomeric insulating materials can be molded in matched metal dies for subsequent bonding to the rocket motor case. Moreover, formulations of the elastomeric insulating materials can be adapted to the process of U.S. Ser. No. 378,588 filed May 17, 1982 (incorporated herein by reference) which utilizes ribbon material in making precision rocket motor case insulation in automated fashion.

The following examples further illustrate aspects of this invention. The illustration by way of these examples is not intended to limit the scope of this invention, but, rather, to demonstrate its varied practice.

As used in these examples erosion rate is defined as the thickness of elastomeric insulating material before test less thickness after the test divided by action time where action time is the time between when the motor starts to exhaust at 100 psi and when the motor exhaust tails off to 100 psi. Char rate is defined as elastomeric insulating material thickness after test minus thickness after removal of char divided by the action time. Decomposition rate is defined as the elastomeric insulating material thickness before test minus thickness after char removal divided by the action time. Values of the aforedefined rates designated with a plus (+) sign indicate accumulation of material during test such that the substraction, noted above, leads to a positive number.

EXAMPLE 1

Set forth in Table 1 below are specific formulations for elastomeric insulating materials of this invention. The insulating materials were generally compounded at temperatures below 250° F. with roll mixers held at between about 40° and 80° F. as follows:

| Order of Addition | Range of Mixing Times |
| --- | --- |
| Elastomer Polymer | 1–10 minutes |
| Peroxy Curing Agent | 2–10 minutes |
| Flame Retardant if any | 10–15 minutes |
| Inorganic particulate | 5–10 minutes |
| Organic polymer additive, if any | 5–10 minutes |
| Polyaramide Pulp | 10–15 minutes |

When liquid polybutadiene was used, it was added with the polyaramide pulp to keep effective mixing of the pulp.

The compounded materials were cured at temperatures between about 310° and 350° F. for times of up to about an hour with thickness of 0.2 inches of the test samples. Tables 2, 3, 4, 5, and 6 list the properties of formulations A, B, C, D, and E of Table 1, respectively.

TABLE 1

| Ingredients, phr | A | B | C | D | E |
| --- | --- | --- | --- | --- | --- |
| EPDM[a] | 100.0 | | 80.0 | | |
| 2,5-dimethyl-2,5-di-(t-butylperoxy)hexane[b] | 2.5 | 2.5 | 2.5 | 1.25 | 2.5 |
| Polyaramide Pulp[c] | 20.0 | 50.0 | 50.0 | 50.0 | 50.0 |
| Antimony oxide | 20.0 | | | | |
| Chlorinated compound[d] | 40.0 | | | | |
| Liquid polybutadiene[e] | 10.0 | | | | |
| Polychloroprene Rubber[f] | | 80.0 | | | |
| Hydroxy-terminated polybutadiene[g] (liquid) | | 20.0 | | | |
| Silica[h] | | | 20.0 | 20.0 | 20.0 |
| Magnesium oxide | | 2.4 | | 2.00 | |
| Liquid polybutadiene (high vinyl)[i] | | | 20.0 | 20.0 | |
| Chlorosulfonated polyethylene[j] | | | | 80.0 | |
| Pentaerythritol[k] | | | | 1.50 | |
| Dipentamethylenethiuriumhexasulfide[l] | | | | 1.00 | |
| Polyurethane rubber[m] | | | | | 100.0 |
| Polyester-polyol[n] | | | | | 10.0 |

[a]Nordel 1040 product of DuPont
[b]Varox product of R. T. Vanderbilt
[c]Kevlar 29 Pulp product of DuPont
[d]Dechlorane Plus 515 product of Hooker Chemical
[e]Butarez NF product of Phillips Petroleum
[f]Neoprene WRT product of DuPont
[g]Hycar 1300 × 16 product of B. F. Goodrich
[h]Hi-Sil 233 product of Harwick Chemical
[i]Ricon 150 product of Colorado Specialties
[j]Hypalon LD-999 product of DuPont
[k]P. E. 200 product of Hercules Incorporated
[l]Tetrone A product of DuPont
[m]Vibrathane 5004 product of Uniroyal
[n]Multron R-18 product of Mobay

TABLE 2

Formulation A

Characteristics:

| | | | | | |
| --- | --- | --- | --- | --- | --- |
| 1. | Cure conditions (time at def F) | 30 min. @ 350° F. | | | |
| 2. | Mechanical Properties | | | | |
| | Test Temp. | 77° F. | | −65° F. | 170° F. |
| | Fiber Direction | ** | * | ** | ** |
| | Tensile Strength, psi | 1645 | 540 | 5840 | 1114 |
| | Elongation, % | 30 | 145 | 13 | 20 |
| 3. | Hardness, Shore A | 85 | | | |
| 4. | Density, lb/in³ | 0.0411 | | | |
| 5. | Tg, Degrees F. | −74 | | | |
| 6. | Thermal Conductivity, BTU/lb deg F. | 0.118 | | | |
| 7. | Thermal Diffusivity | 0.0033 | | | |
| 8. | Specific Heat Cal/gm - °C. | 0.42/0.50/0.51 @ 66/94/150° C. | | | |
| 9. | Erosion Date (Minimum Smoke) | | | | |
| | Test Motor | Two Inch | | Six Inch | |
| | Mass Flux, lb/sec in² | 0.245 | | 0.245 | |
| | Erosion Rate, mil/sec | 0 | | +10 | |
| | Char Rate, mil/sec | 8 | | 20 | |
| | Decomposition Rate mil/sec | 8 | | 10 | |
| 10. | Smoke, Colored Photos with Min. Smoke Propellant | None | | | |
| 11. | Compatibility | | | | |
| | Minimum Smoke Propellant | Acceptable | | | |
| | Composite HTPB | Acceptable | | | |
| 12. | Bond, Steel | | | | |
| | Peel (90°), pli | 5/17[1] | | | |
| | Tensile, psi | 213/265[1] | | | |

[1]Primed with Chemlok 233, epoxy adhesive from Hughson Chemical (Lord)
*Perpendicular fiber orientation in test samples resulting from milling and cutting across direction of oriented fiber in milled product.
**Parallel fiber direction in test samples, resulting from milling and cutting with direction of oriented fiber in milled products.

TABLE 3

Formulation B

Characteristics:

| | | | | | |
| --- | --- | --- | --- | --- | --- |
| 1. | Cure conditions (time at def F) | 45 min. @ 310 | | | |
| 2. | Mechanical Properties | | | | |
| | Test Temp. | 77° F. | | −65° F. | 170° F. |
| | Fiber Direction | ** | * | ** | ** |
| | Tensile Strength, psi | 2837 | 1382 | 4172 | 824 |
| | Elongation, % | 10 | 20 | 9 | 12 |
| 3. | Hardness, Shore A | 96 | | | |
| 4. | Density, lb/in³ | 0.04791 | | | |
| 5. | Tg, Degrees F. | −36 | | | |
| 6. | Thermal Conductivity, BTU/lb deg F. | 0.133 | | | |
| 7. | Thermal Diffusivity | 0.0045 | | | |
| 8. | Specific Heat Cal/gm - °C. | 0.34/0.35/0.36 @ 66/94/150° C. | | | |
| 9. | Erosion Date (Minimum Smoke) | | | | |
| | Test Motor | Two Inch | | Six Inch | |
| | Mass Flux, lb/sec in² | 0.245 | | 0.245 | |
| | Erosion, mil/sec | +4 | +9 | | |
| | Char Rate, mil/sec | 12 | 16 | | |
| | Decomposition Rate, mil/sec | 8 | 7 | | |
| 10. | Smoke, Colored Photos with Min Smoke Propellant | None[1] | | | |
| 11. | Compatibility | | | | |
| | Minimum Smoke propellant | Acceptable | | | |
| 12. | Bond, Steel | | | | |
| | Peel (90° C.), pli | 7/6[2] | | | |
| | Tensile, psi | 1179/1107[2] | | | |

[1]Some after burning
[2]Without/With Chemlok 233
*Perpendicular
**Parallel

TABLE 4

| Formulation C | | | | |
|---|---|---|---|---|
| 1. Cure conditions (time at deg F.) | 30 min @ 350 | | | |
| 2. Mechanical Properties | | | | |
| Test Temp. | 77° F. | −65° F. | 170° F. | |
| Fiber Direction | ** | * | ** | ** |
| Tensile Strength, psi | 2446 | 988 | 5039 | 1040 |
| Elongation, % | 10 | 40 | 10 | 15 |
| 3. Hardness, Shore A | 95 | | | |
| 4. Density, lb/in³ | 0.0388 | | | |
| 5. Tg, Degrees F. | −72 | | | |
| 6. Thermal Conductivity, BTU/lb deg F. | 0.124 | | | |
| 7. Thermal Diffusivity | 0.004 | | | |
| 8. Specific Heat Cal/gm - °C. | 0.46/0.43/0.44 @ 66/94/150° C. | | | |
| 9. Erosion Data (Minimum Smoke) | | | | |
| Test Motor | Two Inch | Six Inch | | |
| Mass Flux, lb/sec in² | 0.245 | 0.245 | | |
| Erosion Rate, mil/sec | 4 | 7 | | |
| Char Rate, mil/sec | 5 | 18 | | |
| Decomposition Rate mil/sec | 9 | 12 | | |
| 10. Smoke, Colored Photos with Min Smoke Propellant | None | | | |
| 11. Compatibility | | | | |
| Minimum Smoke Propellant | Acceptable | | | |
| Composite HTPB | Acceptable | | | |
| 12. Bond, Steel | | | | |
| Peel (90° C.), pli | 17/22[1] | | | |
| Tensile, psi | 663/565[1] | | | |

[1] Primed with Chemlok 233
*Perpendicular
**Parallel

TABLE 5

| Formulation D | | | | |
|---|---|---|---|---|
| Characteristics: | | | | |
| 1. Cure Conditions (time at deg F.) | 30 mins @ 350 | | | |
| 2. Mechanical Properties | | | | |
| Test Temp. | 77° F. | −65° F. | 170° F. | |
| Fiber Direction | ** | * | ** | ** |
| Tensile Strength, psi | 3991 | 1300 | 2928 | 1148 |
| Elongation, % | 10 | 60 | 10 | 17 |
| 3. Hardness, Shore A | 95 | | | |
| 4. Density, lb/in³ | 0.04552 | | | |
| 5. Tg, Degrees F. | −15 | | | |
| 6. Thermal Conductivity, BTU/lb deg F. | 0.0041 | | | |
| 7. Thermal Diffusivity | 0.0004 | | | |
| 8. Specific Heat Cal/gm - °C. | 0.37/0.39/0.44 @ 66/94/150° C. | | | |
| 9. Erosion Data (Minimum Smoke) | | | | |
| Test Motor | Two Inch | Six Inch | | |
| Mass Flux, lb/sec in² | 0.245 | 0.245 | | |
| Erosion Rate, mil/sec | +1 | +4 | | |
| Char Rate, mil/sec | 10 | 14 | | |
| Decomposition Rate, mil/sec | 9 | 8 | | |
| 10. Smoke, Colored Photos with Min Smoke Propellant | None | | | |
| 11. Compatibility | | | | |
| Minimum Smoke Propellant | Acceptable | | | |
| Composite HTPB | Acceptable | | | |
| 12. Bond, Steel | | | | |
| Peel (90°), pli | 9/15[1] | | | |
| Tensile, psi | 255[1] | | | |

[1] Primed with Chemlok 233
*Perpendicular
**Parallel

TABLE 6

| Formulation E | | | | |
|---|---|---|---|---|
| Characteristics: | | | | |
| 1. Cure conditions (time at deg F.) | 30 min @ 350 | | | |
| 2. Mechanical Properties | | | | |
| Test Temp. | 77° F. | −65° F. | 170° F. | |
| Fiber Direction | ** | * | ** | ** |
| Tensile Strength, psi | 3468 | 1548 | 3609 | 1863 |
| Elongation, % | 20 | 70 | 5 | 24 |
| 3. Hardness, Shore A | 92 | | | |
| 4. Density, lb/in³ | 0.04766 | | | |
| 5. Tg, Degrees F. | −29 | | | |
| 6. Thermal Conductivity, BTU/lb deg F. | 0.164 | | | |
| 7. Thermal Diffusivity | 0.0045 | | | |
| 8. Specific Heat Cal/gm - °C. | 0.33/0.37/0.44 @ 66/94/150° C. | | | |
| 9. Erosion Data (Minimum Smoke) | | | | |
| Test Motor | Two Inch | Six Inch | | |
| Mass Flux, lb/sec in² | 0.245 | | | |
| Erosion Rate, mil/sec | 3 | | | |
| Char Rate, mil/sec | 7 | | | |
| Decomposition Rate, mil/sec | 10 | | | |
| 10. Smoke, Colored Photos with Min Smoke Propellant | None | | | |
| 11. Compatibility | | | | |
| Minimum Smoke Propellant | Acceptable | | | |
| Composite HTPB | Acceptable | | | |
| 12. Bond, Steel | | | | |
| Peel (90° C.), pli | 3[1] | | | |
| Tensile, psi | 51[1] | | | |

[1] Without primer
*Perpendicular
**Parallel

As can be noted from Tables 2–6, among the advantageous properties of the elastomeric insulating materials of this invention is the thermal conductivity thereof i.e. in a range between about 0.11 and 0.13 BTU/lb/°F.

EXAMPLE 2

Set forth in Table 7 are results from using the elatomeric insulating materials (A, B, C and D) of Example 1 in test rocket motors having twelve pounds of propellant. The first column in Table 7, "Mass Flux", refers to the rate at which combustion products exit the rocket motors.

The data of Table 7 illustrate that elastomeric insulating materials of this invention exhibit exceptional erosion, char, and decomposition rate making them outstanding candidates for use in tactical rocket motors as insulation for the case walls and blast tube ramps thereof. At low mass fluxes, the erosion rate is neglible.

TABLE 7

| Formulation | Mass Flux, lb/sec in² | Erosion Rate, mil/sec | Decomposition Rate, mil/sec |
|---|---|---|---|
| A | 0.180 to 0.216 | +3 | 8 |
|   | 0.502 | +1 | 14 |
|   | 1.97 | 94 | 93 |
| B | 0.172 to 0.220 | +9 | 8 |
|   | 0.501 | 1 | 16 |
|   | 1.77 | 42 | 47 |
| C | 0.174 to 0.215 | 6 | 12 |
|   | 0.470 | 14 | 30 |
|   | 1.80 | 66 | 67 |
| D | 0.174 to 0.214 | +3 | 8 |
|   | 0.470 | 1 | 17 |
|   | 1.90 | 49 | 49 |

In preparing samples for full scale rocket motor testing, five case and ramp type (insulators (A)–(E) of Table 1) were separately compounded on a 30-inch differential roll mill, where compounding was in 20- to 30-pound batches. After compounding, each material was sheeted on an even-speed roll mill to yield sheets approximately 36-inches×24-inches and at a thickness of 30 mils. These sheets were used to form the wall insulators for the full-scale (40-pound), minimum-smoke motor tests. Forming was performed with tooling used to form insulators for an existing rocket motor. This tooling accommodates a case 41-inches long, with a 9.35-inch inside diameter; an inflatable bladder was used to pressurize and mold the insulators against the inside diameter of the case. Forming and curing were carried out at a bladder pressure of 100 psig and a temperature of 340±5 F. Length of the tooling was sufficient to allow the molding of two insulators simultaneously, with dimensions of 9.3-inch outside diameter and 19-inch long.

No difficulties were encountered in forming the insulator sleeves from the above materials.

Longitudinal strips about 5 by 16 inches were cut from the molding and bonded into phenolic sleeves that could be slipped into the 40-pound test motor wall test section. The strips were bonded into the phenolic sleeve with a high-temperature epoxy adhesive using a pressurized bladder to hold the insulator strips in place while the adhesive cured.

In addition to the case wall insulators, rings (9-inch outside diameter, 5.5-inch inside diameter, and 2-inches thick) were molded from formulation D of Table 1 as an approach section for the nozzles or blast tubes.

Forty-pound motor evaluations consisted of four firings. Motors No. 1 through 3 contained specimens of the five-wall insulators. Motors No. 2 through 4 were equipped with blast tube sections.

Motor No. 1 was a low-pressure firing, containing the five case wall insulators and a nozzle entrance section of formulation D. Data, provided in Table 8, show excellent erosion resistance and low decomposition rates at a mass flux of 0.164 lb/sec-in.$^2$ for elastomeric insulating materials of this invention.

Set forth in table 8 are the results from firing these test rocket motors containing the forty pounds of propellant. "ER" and "DR" in Table 8 stand for "erosion rate" and "decomposition rate". The "wall section" is a section of the cylindrical portions of the rocket motors. The "ramp section" is a section between the cylindrical sections and blast tube sections of the rocket motors. As can be seen by viewing Table 8, the erosion rates at low mass fluxes, i.e. 0.164–2.22 lb/sec in$^2$, is negligible. In general as can be seen by viewing tables 2–8 together, the erosion rates of the low density insulators of this invention are excellent, especially in view of the fact that the densities are lower than typical asbestos insulators.

TABLE 8

| Location/Motor No. | Mass Flux, lb/sec-in.$^2$ | Velocity ft/sec | A ER[1] | A DR[2] | B ER | B DR | C ER | C DR | D ER | D DR | E ER | E DR |
|---|---|---|---|---|---|---|---|---|---|---|---|---|
| Wall Section | | | | | | | | | | | | |
| Motor No. 1 | 0.164 | 67 | +2 | 7 | 0 | 8 | 1 | 6 | 0 | 7 | 3 | 6 |
| 2 | 0.237 | 42 | 4 | 11 | 3 | 12 | 2 | 7 | 2 | 8 | 1 | 7 |
| 3 | 0.222 | 44 | +2 | 8 | +3 | 7 | +2 | 6 | +5 | 4 | +3 | 4 |
| Ramp Section | | | | | | | | | | | | |
| Motor No. 1 | 0.385 | 104 | | | | | | | +7 | 6 | | |
| | 0.485 | 130 | | | | | | | +2 | 7 | | |
| 2 | 0.558 | 97 | | | | | | | | | | |
| | 0.700 | 121 | | | | | | | | | | |
| 3 | 0.529 | 104 | | | | | | | | | | |
| | 0.675 | 132 | | | | | | | | | | |
| 4 | 0.521 | 105 | | | | | | | +6 | 3 | | |
| | 0.663 | 135 | | | | | | | +6 | 5 | | |

What is claimed is:

1. An elastomeric insulating material for use in rocket motors as low smoke case wall or blast tube ramp insulation, said elastomeric insulating material having a density between about 0.035 and 0.045 and consisting essentially of:

100 parts by weight of peroxy crosslinked EPDM in which are dispersed between about 10 and 100 parts by weight of a char forming organic fiber comprising polyaramide pulp and between about 5 and 75 parts by weight of inorganic particulate.

2. The elastomeric insulating material in accordance with claim 1, which is formulated with liquid polybutadiene and a peroxy crosslinking agent.

3. The elastomeric insulating material in accordance with claim 2, wherein said inorganic particulate comprises hydrated silica.

4. The elastomeric insulating material in accordance with claim 1, wherein said char forming organic fiber consists essentially of 15–75 parts by weight polyaramide pulp.

5. The elastomeric insulating material of claim 1 which further includes flame retardant selected from chlorinated compounds, antimony oxide and combinations thereof.

* * * * *

UNITED STATES PATENT AND TRADEMARK OFFICE
CERTIFICATE OF CORRECTION

PATENT NO. : 4,501,841
DATED : February 26, 1985
INVENTOR(S) : Liles G. Herring

It is certified that error appears in the above-identified patent and that said Letters Patent are hereby corrected as shown below:

Column 12, line 37 after "0.045" insert

--pounds per cubic inch--

Signed and Sealed this

Sixteenth Day of July 1985

[SEAL]

*Attest:*

DONALD J. QUIGG

*Attesting Officer*  *Acting Commissioner of Patents and Trademarks*